331-98

Sept. 25, 1951 W. H. FREEMAN 2,568,727

ULTRA HIGH FREQUENCY VACUUM TUBE OSCILLATOR DEVICE

Filed Nov. 27, 1943 3 Sheets-Sheet 1

INVENTOR.
WILLIAM H. FREEMAN
BY William D. Hall
Attorney

SEARCH ROO

Sept. 25, 1951 W. H. FREEMAN 2,568,727

ULTRA HIGH FREQUENCY VACUUM TUBE OSCILLATOR DEVICE

Filed Nov. 27, 1943 3 Sheets-Sheet 2

INVENTOR.
WILLIAM H. FREEMAN
BY William D. Hall.
Attorney

Sept. 25, 1951 W. H. FREEMAN 2,568,727

ULTRA HIGH FREQUENCY VACUUM TUBE OSCILLATOR DEVICE

Filed Nov. 27, 1943 3 Sheets-Sheet 3

INVENTOR.
WILLIAM H. FREEMAN
BY William D. Hall
Attorney

Patented Sept. 25, 1951 2,568,727

UNITED STATES PATENT OFFICE 2,568,727

ULTRA HIGH FREQUENCY VACUUM TUBE OSCILLATOR DEVICE

William H. Freeman, Belmar, N. J.

Application November 27, 1943, Serial No. 511,924

14 Claims. (Cl. 315—5)

(Granted under the act of March 3, 1883, as amended April 30, 1928; 370 O. G. 757)

The invention described herein may be manufactured and used by or for the Government for governmental purposes, without the payment to me of any royalty thereon.

My invention relates to improvements in electromagnetic wave generators and more particularly to vacuum tube oscillators adapted to operate at ultrahigh frequencies.

There are two main factors limiting the output and efficiency of a vacuum tube in an oscillator circuit as the operating frequency is raised above a certain level: first, the inductances and capacitances associated with the tube electrodes and their internal leads, which effect is of the nature of circuit limitations incurred by the presence of the tube and, second, electron transit time limitation affecting the electronic mechanism of the tube and its capability of generating electromagnetic oscillations.

Due to these limitations, vacuum tubes designed for ultrahigh frequency operation have been greatly reduced in size. Electrode leads have been designed with an aim to reducing their inductances, and the electrodes have been arranged with a view to minimizing the interelectrode capacities.

In the tank circuits associated with the vacuum tube electrodes in oscillators, it has been necessary in order to reach the ultrahigh frequency range, when using solenoid inductances, to lower the number of inductance coil turns so that only a single loop of wire remains. Such tank circuits, however, have serious drawbacks, since a considerable amount of energy is lost due to skin effect and magnetic field leakage or radiation.

Improved oscillator efficiency and stability may be achieved by the use of concentric lines in lieu of inductance coils for tank circuit or by the use of parallel wire lecher systems, but such systems are structurally cumbersome, and therefore unsuitable where a compact construction is required, as for example in the local oscillator of an ultrahigh frequency superheterodyne receiver.

A tank circuit for an ultrahigh frequency oscillator, which is both efficient in operation and compact in structure, may be obtained by the use of the single turn toroid inductance. The nature of this inductance is such that the electromagnetic flux is restricted within the confines of the structure, thereby preventing losses due to radiation. Further gains in efficiency are realized because of the large conducting area of the single turn toroid, and tuning may be accomplished by means of simple variable shunt capacity methods.

Accordingly, an object of my invention is to provide a new improved ultrahigh frequency oscillator in which at least one of the reactive elements is a single turn toroid.

Another object of my invention is to provide an improved ultrahigh frequency oscillator of the type adapted to receive standard types of vacuum tubes as part of a constructional unit.

A further object of my invention is the construction of an ultrahigh frequency vacuum tube oscillator of the grounded grid type, which will operate at higher frequencies with standard type tubes than heretofore possible.

A still further object of my invention is the construction of an ultrahigh frequency vacuum tube oscillator, which is compactly constructed and easily adjustable for frequency.

The novel features that I consider characteristic of my invention are set forth with particularity in the appended claims. The invention, however, both as to its organization and its methods of operation, together with additional objects and advantages thereof, will best be understood from the following description of specific embodiments when read in connection with the accompanying drawing in which Figure 1 is a vertical section showing an embodiment of my invention;

Figure 1:
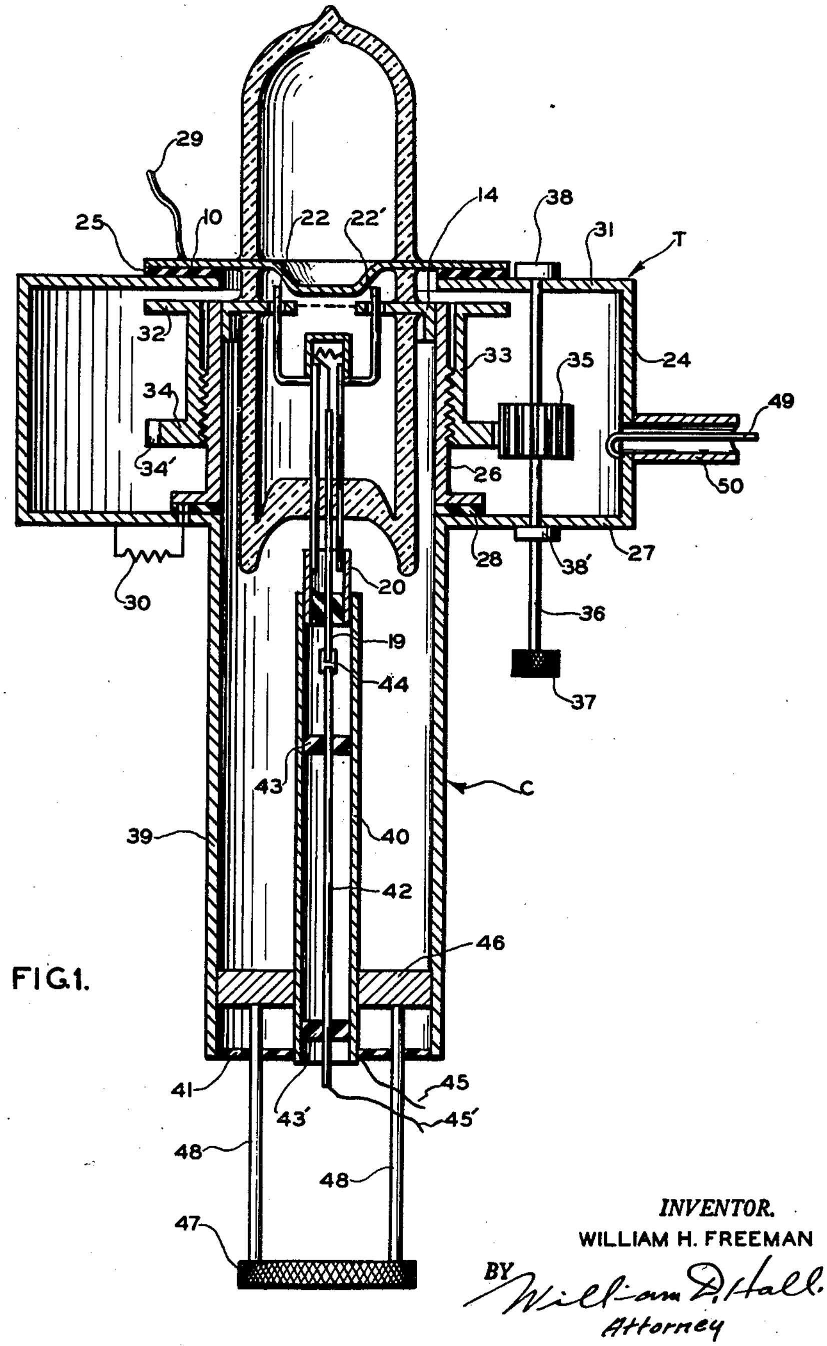
Figure 2:
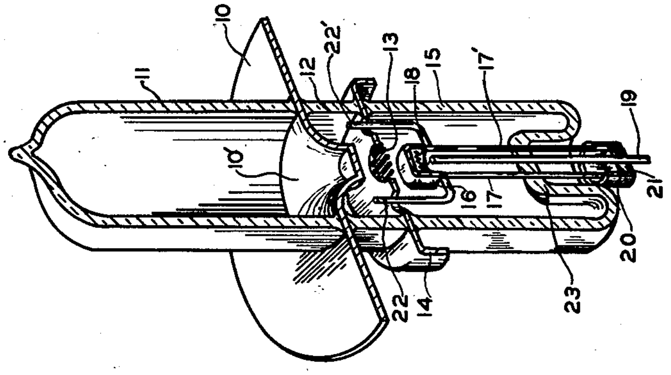
Figure 2 is a sectional view in perspective of a tube employed in conjunction with my invention.

Referring to the drawing, and more particularly to Figure 2, the tube comprises a circular anode 10, which is sealed between glass envelope sections 11 and 12. The anode portion 10′ within the glass envelope is drawn downwardly and brought in close proximity to the grid wires 13. It further comprises a grid connector cup 14 sealed in between glass envelope sections 12 and 15 with the grid wires 13 mounted in the central area of the grid connector cup 14. The cathode 16 is a cup supported by lead-in wires 17 and 17′, and is heated by means of a filament 18 energized through another lead-in wire 19. The cathode and filament lead-in wires are brought out of the glass envelope through a reentrant glass seal 23 to a metal cylinder 20. The cathode lead-in wires 17 and 17′ are connected to the inner surface of the metal cylinder 20 to which it may be brazed, while the filament lead-in wire 19 is held concentrically within the metal cylinder 20 by means of a ceramic plug 21 and extends shortly beyond the cylinder 20. A pair of wires 22 and 22′ are connected to the base of a cathode cup 16 and project through apertures in the plane of the grid connector 14 to the neighborhood of the anode 10′. The functions of these wires will be explained in connection with Figure 1. Anode 10, cup 14, and cylinder 20 serve as the terminals of the vacuum tube.

It is to be understood that the vacuum tube employed in conjunction with the oscillator structure does not per se constitute my invention, but is illustrated in order to clarify the electrical and mechanical relationships between the vacuum tube and its associated circuit elements.

Referring now to Figure 1, the tube sets into an oscillator structure comprising a cavity resonator herein shown as a toroidal circuit, generally designated T, and a coaxial line circuit, generally designated C. The toroidal circuit T is connected between the anode and grid of the tube, while the coaxial line circuit is connected between the grid and cathode of the tube.

Toroidal circuit T has an annular portion 24 which is insulated from the anode 10 with respect to direct current by means of a washer 25, composed of mica or a substance of similar insulating properties. It also comprises an inner wall 26, the upper end of which is of such dimensions that it receives the grid connector cup 14 with a snug fit. The inner wall 26 is insulated from the outer wall 27 with respect to direct current by means of a mica washer 28, or other insulation. The capacitance due to washers 25 and 28 is such that there is no appreciable impedance offered to ultrahigh frequency currents at either 25 or 28. The direct current insulation permits the application of D. C. potential to the anode and grid bias to the grid, the anode potential being applied by means of a clamping ring not shown, but here schematically indicated by conductor 29 connected to the anode 10, the grid potential being provided by means of a bias resistor 30 connected between the inner wall 26 and outer wall 27.

The tuned circuit between grid and plate, consisting of a single open loop of metal, is completed by a shunt capacitance between the wall 31 and flange 32. The resonant frequency of the tuned circuit may be adjusted by varying the spacing between the top wall 31 and flange 32. For this purpose, flange 32 is carried by a sleeve 33 which is axially movable on the inner wall 26. In the present embodiment this movement is obtained by a threaded relation between a portion of the inner wall 26 and a portion of the sleeve 33. Gear teeth 34′ are formed about the periphery of a flange 34 extending from the lower end of sleeve 33, said gear teeth meshing with pinion 35 carried on shaft 36, rotatable by means of knob 37. The shaft is maintained in position on the toroid structure by means of washers 38 and 38′ The parts 35, 36, 37, 38 and 38′ are preferably made of insulating material.

By manually rotating knob 37, the pinion 35 engages gear teeth 34 and axially moves the sleeve 33 along the surface of the inner wall 26, thereby diminishing or increasing the capacitance between flange 32 and wall 31, depending upon the direction of rotation of knob 37.

The coaxial line C is made up of an outer tubular conductor 39 and an inner tubular conductor 40, said inner conductor being held concentrically within said outer conductor by means of a ceramic bead 41. The inner conductor 40 is received over the metal cylinder 20 forming a part of the vacuum tube. In order to securely retain the cylinder 20 within the inner coaxial conductor 40, the upper end of the inner coaxial conductor is of such dimensions that it receives the cylinder 20 with a firm grasp. The heater lead in wire 19 is received by a pin 42 held concentrically within the inner coaxial conductor by means of ceramic beads 43 and 43′ and the heater lead 19 is secured to the pin 41 by means of a spring socket 44. Heater current for the cathode may be provided by means of conductors 45 and 45′.

The coaxial line may be tuned by means of a metal shorting disc 46, the latter being moved by means of a handle 47 attached to the disc by means of dowels 48 and 48′.

This assembly functions as a grounded grid oscillator. To make the tube oscillate, it is only necessary to provide sufficient energy or feedback from an anode-grid toroidal circuit T to the grid-cathode coaxial line circuit C to sustain the oscillations in a well known manner.

Feedback capacity necessary for satisfactory operation over the entire wavelength range of the oscillator has been provided within the vacuum tube by wires 22 and 22′ which serve to increase the normal effective interelectrode capacity between anode and cathode.

Output energy may be drawn from the oscillator in a well known manner, the arrangement shown being the concentric output line composed of the looped conductor 49 connected inside of the toroid T and extending outside through the concentric pipe 50, forming a concentric line.

It should be noted that inner wall 26 is in effect part of the outer conductor 39 of concentric line C, so that wall 26 serves as part of both the grid-cathode and grid-plate tuning elements, thereby providing a more compact and more efficient construction.

Figure 3:
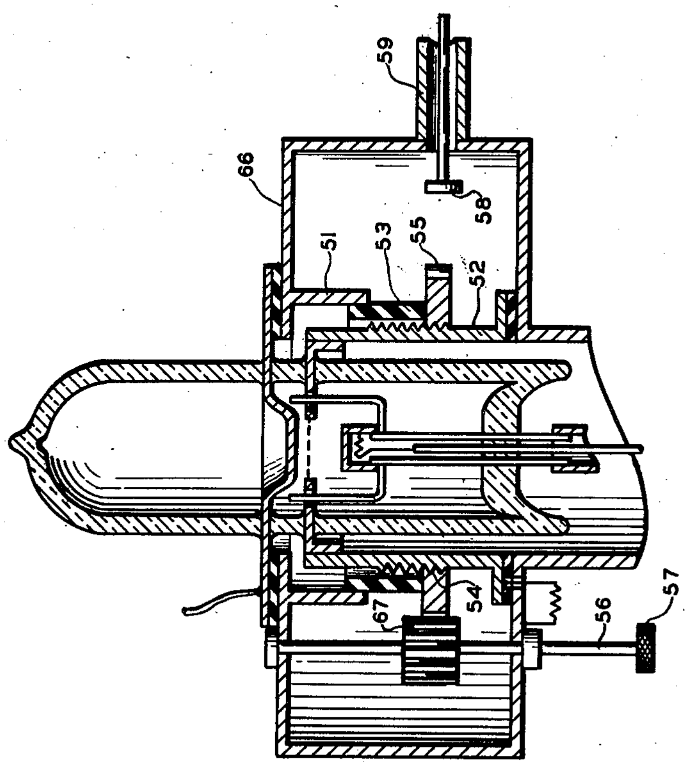
Figure 3 is a vertical section showing a modification of my invention.

Figure 3 illustrates an upper portion of an oscillator which is generally similar to that in Figure 1 but differs somewhat in the tuning means employed. In the present embodiment, a cylindrical flange 51 is secured to the top wall 66 of toroidal circuit T and is capacitatively related to the upper end of the inner wall 52. There is a fixed spacing between these walls but the capacitance may be varied by axially moving an insulation ring 53 into or out of the space between the walls. For accurate control, the axial movement is preferably provided by means of a thread 54 formed on the surface of the inner wall 52 and gear teeth 55, the latter being engaged by a pinion 67 rotated by shaft 56 and a control knob 57. The parts 56, 67, and 57 are preferably made of insulation material.

Power is taken from the oscillator by means of a capacitance disc 58 and a coaxial line 59. It will be understood that the capacitance disc arrangement of Figure 3 and the loop arrangement of Figure 1 are alternative methods of deriving power from the oscillator and may be used interchangeably.

Figure 4:
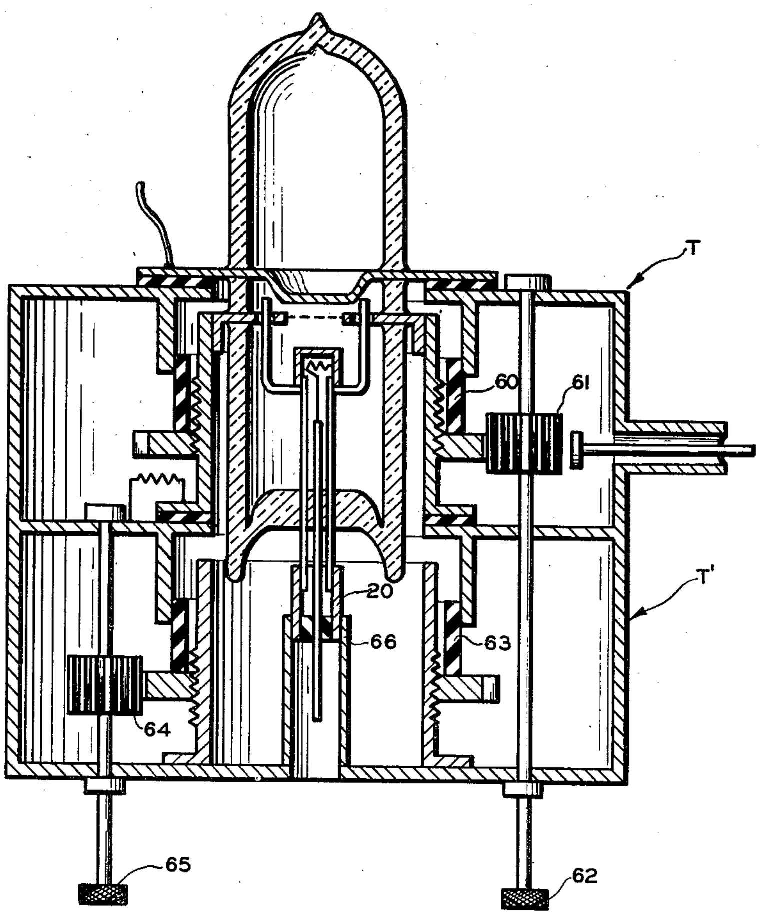
Figure 4 is a vertical section showing a further modification of my invention.

A further modification of the oscillator is shown in Figure 4. This oscillator employs an upper toroidal circuit T similar to that described in connection with Figure 3, and another lower toroidal circuit $T^1$, which is connected between the grid and cathode of the vacuum tube and so replaces the coaxial line C used in the oscillator of Figures 1 and 3.

Referring to Figure 4, it will be seen that the upper toroidal inductance T is variably tuned by means of an insulation ring 60 controlled by a pinion 61 and control knob 62. The lower toroidal inductance $T^1$ is tuned by means of an insulation ring 63, the position of which is controlled by a pinion 64 and control knob 65. The dimensions of the upper end of inner wall 66 of toroidal $T^1$ are such as to obtain a snug fit between the metal cylinder 20 of the cathode and the inner wall 66.

The construction units illustrated in Figures 1, 3, and 4 have been particularly designed for use with a vacuum tube with the type illustrated in Figure 2, although it is to be made clear that the principles of the present invention and the structural unit itself are applicable to other types of tubes which are operable at high frequencies.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention .

I claim:

1. A high frequency oscillator comprising in combination with a vacuum tube, including an envelope housing cathode, grid, and anode electrodes, a substantially cylindrical-shaped cathode terminal projecting from one end of the envelope, grid and anode terminals extending radially from the envelope; a resonant circuit comprising a toroid having an outer wall and an inner wall, said inner wall being electrically coupled to said outer wall, said toroid being disposed about said tube envelope and having means for electrically coupling one of said walls to the anode terminal and means for electrically connecting the other of said walls to the grid terminal; and a coaxial line, the outer conductor of which is electrically connected to one of the walls of said toroid, the inner conductor of which is electrically connected to the cathode terminal of said tube.

2. In the combination of claim 1, a slideable short-circuiting disc between the inner conductor and outer conductor of said coaxial line.

3. In the combination of claim 1, a metallic sleeve including an annular flange projecting from one end of the sleeve, said sleeve being concentrically disposed about the inner wall of said toroid and electrically connected to said inner wall, the flange of said sleeve being disposed in capacitative relationship to the outer wall of said toroid, and means for axially moving said sleeve on the inner wall of said toroid to vary said capacitative relationship.

4. In the combination of claim 1, a cylindrical metal flange, said flange being mounted on and in electrical connection with the outer wall of said toroid and disposed in capacitative relationship with the inner wall of said toroid; an insulation ring, said ring being disposed concentrically about the inner wall of said toroid, and means for axially moving said insulation ring on the inner wall of said toroid so as to vary said capacitative relationship.

5. An ultra-high frequency oscillator comprising in combination with a vacuum tube, including an envelope housing axially spaced cathode, grid, and anode electrodes, axially spaced terminals for said electrodes, including a cathode terminal projecting from one end of the envelope, and grid and anode terminals extending radially from the envelope; a resonant circuit comprising a pair of toroids, each having an outer wall and an inner wall radially spaced from one another, said outer walls being respectively electrically coupled to said inner walls, one of said toroids concentrically surrounding said tube envelope and having means for electrically connecting one of the walls of said one toroid to the anode terminal of said tube, another of the walls thereof being electrically connected to the grid terminal of said tube, the other of said toroids having one of the walls thereof electrically connected to the cathode terminal of said tube and the other of the walls thereof electrically connected to one of the walls of the first toroid, and tuning means coupled between said grid and cathode and said cathode and grid, the inner walls of said toroids constituting a part of said tuning means.

6. The combination of claim 5, wherein said tuning means include a pair of cylindrical metal flanges, each of said flanges being mounted and in electrical connection with the outer walls of said pair of toroids and disposed in capacitative relationship with the inner walls of said pair of toroids; a pair of insulation rings, each of said rings being disposed concentrically about the inner walls of said pair of toroids, and means for axially moving each of said rings on the inner walls of said pair of toroids so as to vary said capacitative relationship.

7. A high frequency oscillator comprising in combination a vacuum tube having an envelope, cathode, grid, and anode electrodes within said envelope, a toroidal cavity resonator coupling at least two of said electrodes, said resonator being concentric with and surrounding said envelope, said resonator having inner and outer walls, dielectric material separating said inner and outer walls to provide insulation therebetween for direct currents, but providing capacitive coupling of low impedance to currents of said frequency, and means for varying the capacity between said inner and outer walls, said means comprising an annular member surrounding said inner wall and axially movable relative thereto.

8. An oscillator as set forth in claim 7, wherein said inner and outer walls are conductively connected to said grid and cathode electrodes, respectively, and means to develop a direct-current bias potential between said inner and outer walls.

9. An oscillator as set forth in claim 8, wherein said anode has an annular terminal extending therefrom to the outside of said envelope, said terminal overlying a portion of said outer wall, and annular dielectric member surrounding said envelope and disposed between said terminal and said portion to provide insulation for direct currents and negligible impedance for currents of said frequency.

10. A high frequency oscillator as set forth in claim 7, wherein said annular member has a metallic, annular flange projecting from one end thereof, the surface of said flange being parallel to a portion of the outer wall of said resonator, whereby axial movement of annular member varies said capacity.

11. A high frequency oscillator as set forth in claim 7, wherein said outer wall has a cylindrical metal flange depending therefrom in spaced relationship to said inner wall, and wherein said annular member is a dielectric cylinder adjustably movable into the space between said flange and said inner wall to vary said capacity.

12. An oscillator for generating waves in the ultra-high frequency region or higher comprising, in combination, a vacuum tube envelope, axially-spaced cathode, grid, and anode electrodes therein, axially-spaced terminals for said electrodes, a toroidal cavity resonator coupled between said grid and anode and having radially-spaced inner and outer cylindrical walls concentric with and surrounding said envelope, and tuning means coupled between said cathode and grid, one of said inner walls constituting a part of said tuning means.

13. An oscillator for generating waves in the ultra-high frequency region or higher comprising, in combination, a vacuum tube having axially-spaced cathode, grid, and anode electrodes therein, axially-spaced terminals for said electrodes, a toroidal cavity resonator coupled between said grid and anode and having radially-spaced inner and outer cylindrical walls concentric with and surrounding said envelope, and a concentric line tuning means coupled between said cathode and grid, said tuning means comprising an outer conductor extending from and being aligned with said inner wall and having a diameter equal to said inner wall, said means having an inner conductor connected to and forming a continuation of said cathode terminal.

14. An oscillator for generating waves in the ultra-high frequency region or higher comprising, in combination, a vacuum tube envelope having axially-spaced, planar cathode, grid, and anode electrodes therein, axially-spaced, annular terminals integral with said grid and anode electrodes and extending through said envelope, a cathode terminal extending below said envelope, a toroidal cavity resonator having radially-spaced cylindrical walls concentric with and surrounding said envelope, the inner and outer walls of said resonator being dimensioned to provide engagement with said grid and anode terminals, respectively, dielectric means for separating said outer wall from said anode terminal to provide insulation therebetween for direct currents, said dielectric means providing low impedance for currents of said frequency, similar dielectric means separating said inner and outer walls, and a concentric line tuning means coupled between said cathode and grid, said tuning means comprising an outer conductor extending from and being aligned with said inner wall and having a diameter substantially equal to said inner wall, said means having an inner conductor connected to and forming a continuation of said cathode terminal.

WILLIAM H. FREEMAN.

REFERENCES CITED

The following references are of record in the file of this patent:

UNITED STATES PATENTS

| Number | Name | Date |
|---|---|---|
| 2,177,272 | Zottu | Oct. 24, 1939 |
| 2,235,414 | White | Mar. 18, 1941 |
| 2,259,690 | Hansen et al. | Oct. 21, 1941 |
| 2,266,500 | Lindenblad | Dec. 16, 1941 |
| 2,284,405 | McArthur | May 26, 1942 |
| 2,351,744 | Chevigny | June 20, 1944 |
| 2,353,742 | McArthur | July 18, 1944 |
| 2,353,743 | McArthur | July 18, 1944 |
| 2,412,998 | Litton | Dec. 24, 1946 |